Aug. 27, 1968 W. J. BARTIK ET AL 3,399,309

PARAMETRIC CIRCUITS

Filed Nov. 12, 1963 2 Sheets-Sheet 1

INVENTORS
WILLIAM J. BARTIK
WOO FOUNG CHOW
JOHN V. MURPHY
JOHN B. SCHWARZ

BY [signature]

ATTORNEY

PARAMETRIC CIRCUITS

United States Patent Office 3,399,309
Patented Aug. 27, 1968

3,399,309
PARAMETRIC CIRCUITS

William John Bartik, Jenkintown, Woo Foung Chow, Horsham, John Boss Schwarz, Abington, and John Vincent Murphy, Norristown, Pa., assignors to Sperry Rand Corporation, New York, N.Y., a corporation of Delaware Filed Nov. 12, 1963, Ser. No. 322,818
9 Claims. (Cl. 307—88)

ABSTRACT OF THE DISCLOSURE

A logic system of parametrons is disclosed. The parametron circuit consists of a plated magnetic wire about which a resistor wire is wound to form a resonant circuit. The resonating capacity and tank damping resistors are replaced by self-capacitance and self-resistance of the resistance wire.

This invention relates to parametric circuits, and in particular refers to parametric circuits utilizing thin magnetic film plated wire.

Parametric circuits of the prior art generally included pairs of nonlinear reactors, such as cores having a plurality of coils wound thereon together with fixed capacitors, damping resistors, and coupling resistors. Resonator circuits utilizing the basic "parametron" circuits have been described including a shift register and a majority gate circuit, both of which are useful in electronic data processing machines. Such circuits have been described by Eiichi Goto, Patent No. 2,948,818, issued Aug. 9, 1960.

It is an object of this invention to provide novel parametric circuits which are easier to construct and more economical to produce than those of the prior art.

Another object of this invention is to provide novel parametric circuits utilizing primarily two elements, namely plated wire and resistance wire.

Still another object of this invention is to provide novel parametric circuits utilizing the inherent self-capacity of coils.

In accordance with this invention, parametrically excitable circuits are constructed using solely two components, namely, first, plated wire, and second, resistance wire.

Other objects and advantages of this invention, together with its construction and mode of operation, will become more apparent from the following description, when read in conjunction with the accompanying drawings, in which like reference numerals refer to like components, and in which.

Figures 3A, 3B, 3C:
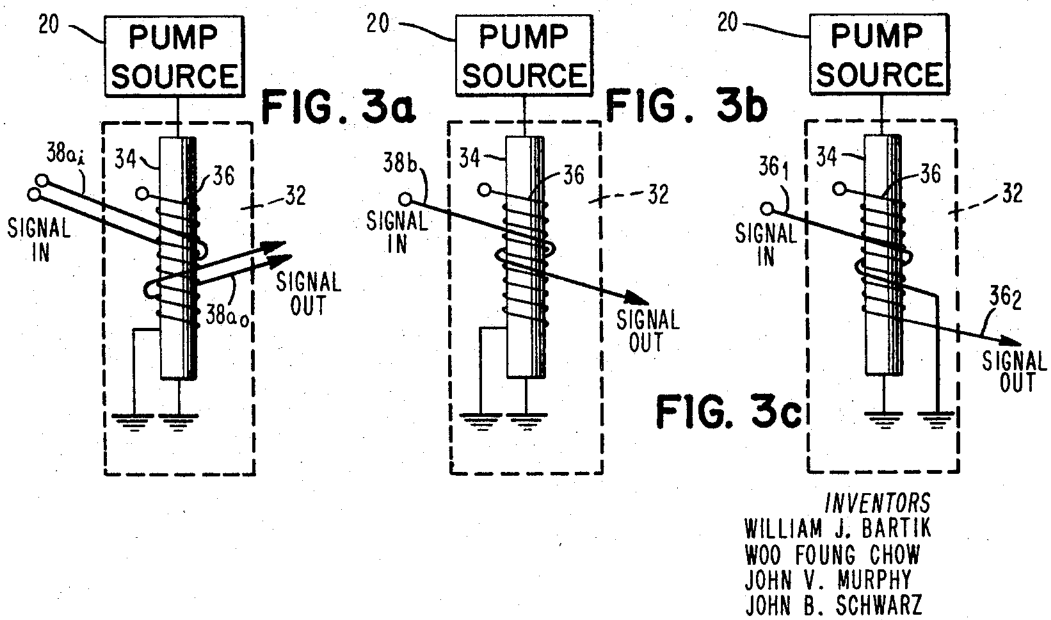
Figure 4A:
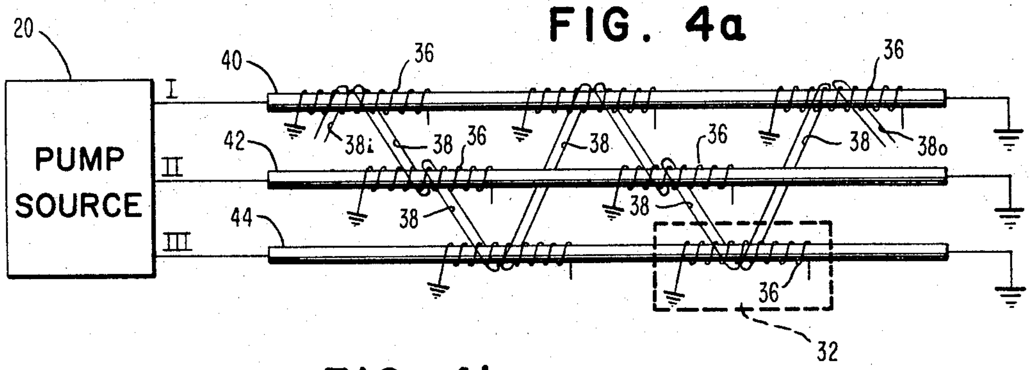
Figure 4B:
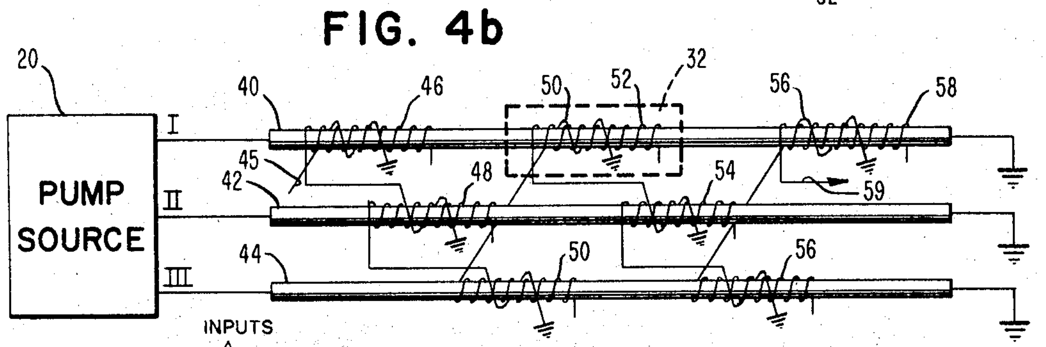
Figure 5A:
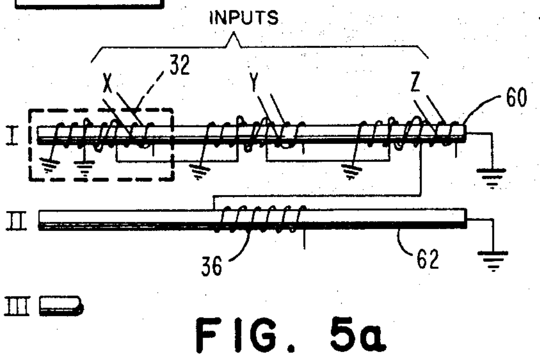
Figure 5B:
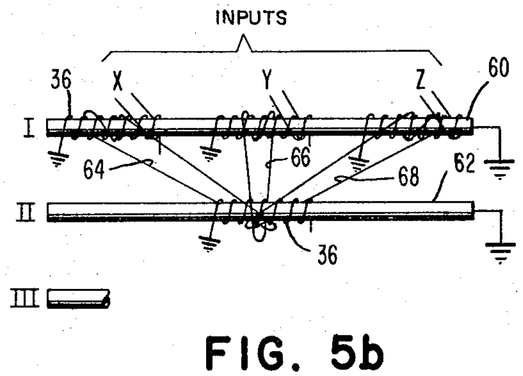
Figure 5C:
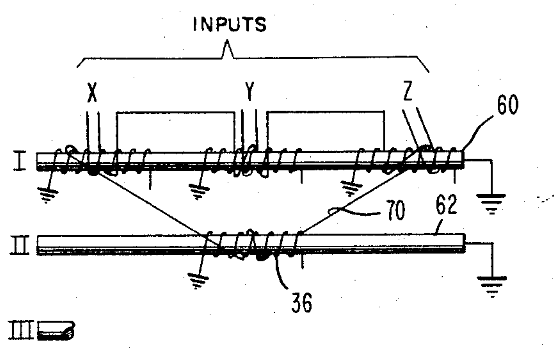

FIG. 3*a* is a diagram illustrating a parametric circuit in accordance with one embodiment of this invention, showing one means of coupling thereto;

FIG. 3*b* is a diagram illustrating a parametric circuit in accordance with an embodiment of this invention showing another means of coupling thereto;

FIG. 3*c* is a diagram illustrating a parametric circuit in accordance with an embodiment of this invention showing still another means of coupling thereto;

FIG. 4*a* is a diagram of a shift register in accordance with one embodiment of this invention;

FIG. 4*b* is a diagram of a shift register in accordance with another embodiment of this invention;

FIG. 5*a* is a diagram of a majority gate circuit in accordance with an embodiment of this invention showing one means of connection;

FIG. 5*b* is a diagram of a magnetic gate circuit showing another means of connection, and;

FIG. 5*c* is a diagram of the magnetic gate circuit showing still another means of connection.

Figures 1, 2:
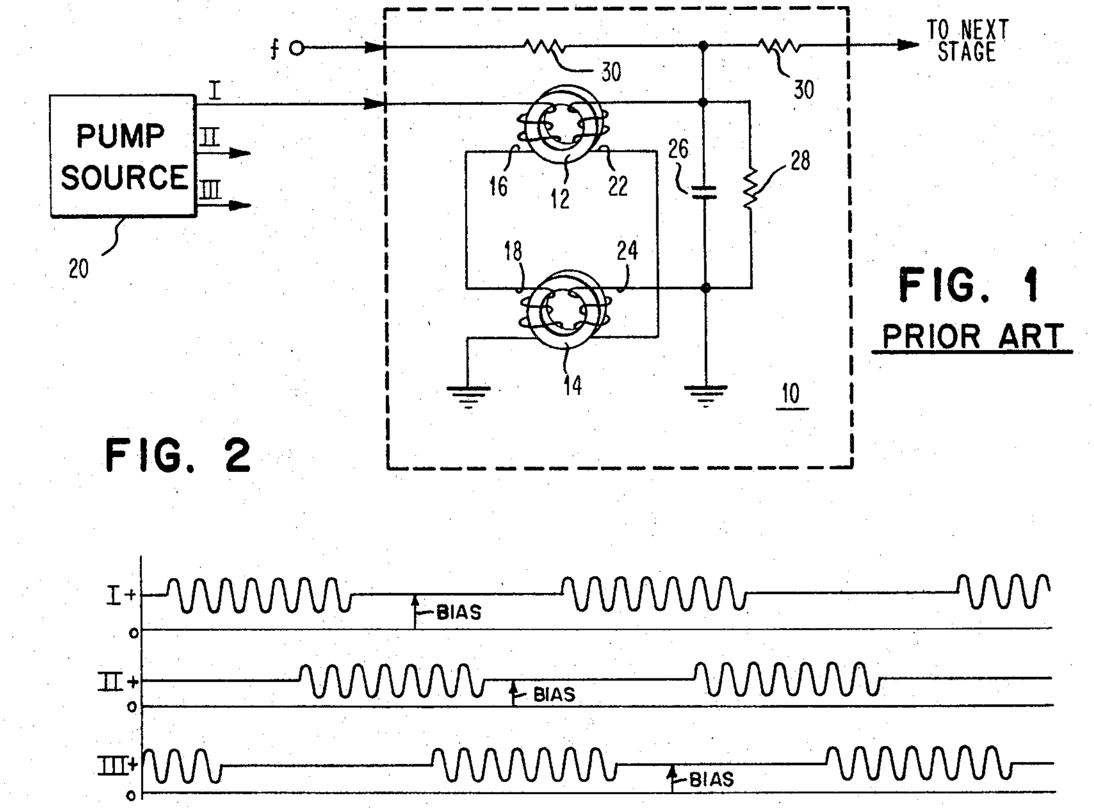
FIG. 1 PRIOR ART, FIG. 2
FIG. 1 is a diagram of a parametron, which has been described in the prior art.
FIG. 2 is a set of wave forms which illustrate the exciting current provided by the pump source, which is applied to various parametric circuits illustrated in other figures.

Referring to FIG. 1, there is shown a parametric circuit 10 of the prior art known as a "parametron." The parametron 10 includes a pair of nonlinear reactors, such as iron oxide cores 12 and 14, pump or excitation windings 16, 18, output windings 22, 24 coupled with a capacitor 26 and damping resistor 28. Input signals are applied to the tuned circuit 22, 24, 26, 28 through an input resistor 30. An output signal is provided from the output circuit by way of a separate output resistor 30.

A pump source 20 provides an alternating current signal to the windings 16, 18. The signal can take the form of one of three different time patterns as shown by way of example in FIG. 2.

The parametron 10 comprises 2 cores, 4 windings, 1 capacitor, and at least 2 resistances.

FIG. 3*a* illustrates a parametric resonator similar in function to the parametron shown in FIG. 1. The parametric resonator 32, in FIG. 3*a*, includes a wire 34 plated with a thin magnetic film. The wire 34 can be, for example, of beryllium-copper alloy having, for example, a 5 mil diameter, and plated with 10,000 angstroms of a nickel-iron alloy, having an 80–20% relationship, with a circumferential anisotrophy axis. A pump source 20 which provides one of the three wave forms illustrated in FIG. 2 is applied to one end of the plated wire 34. The other end of the plated wire 34 is coupled to a point of reference potential, such as ground.

A coil 36 is wrapped about the plated wire 34. The coil 36 is preferably constructed with Nichrome wire having, for example, a 1.4 mil diameter. The coil is wound in preferably two layers of 50 turns each. The inductance of the coil is approximately 600 nh.

The coil 36 has a self-capacity which, together with its tank inductance and self-resistance resonates at a frequency at about 20 mc. so that, upon application of a 40 mc. signal by the pump source 20, the coil 36 resonates.

By initiating the excitation current from the pump sourc 20, the tank coil 36 tends to oscillate in one of two stable phases. A signal input which is applied concurrently or immediately preceding the initiation of the excitation current from the pump source 20 determines the particular phase of oscillation of the resonant circuit including the coil 36.

FIGS. 3*a*, 3*b*, 3*c* illustrate three different methods and means for applying signals to the parametric circuit 32, and for obtaining an output signal from the circuit 32.

FIG. 3*a* shows a separate input winding 38$a_1$ coupled around the coil 36 for applying a signal thereto from a preceding stage or other source of input signals. A separate output winding 38$a_0$ which is coupled about the coil 36 is adapted to apply the output signal to subsequent stages of other parametric circuits, or other suitable load.

FIG. 3*b* shows a wire 38*b* having one or more turns wrapped about the coil 36 thus being adapted to apply a signal input from a preceding state or other suitable source at one end of the wire 38*b* and adapted to apply an output signal to a subsequent parametric stage or other suitable load from the other end thereto.

FIG. 3*c* shows a wire 36$_1$, coming from a preceding state, being wrapped about the coil 36, and terminated by a coupling to a point of reference potential such as ground. One end of the coil 36, illustrated in FIG. 3*c* as 36$_2$ in lieu of being coupled to a point of reference potential such as ground as shown in FIGS. 3*a* and 3*b*, is coupled to a subsequent stage (in a manner similar to wire 36), or to other suitable load.

FIGS. 4*a* and 4*b* each illustrate a shift register in accordance with this invention. A pump source 20 is adapted to provide clocked bursts of alternating current having a frequency 2*f* and a DC bias level as illustrated in FIG. 2.

Three wires 40, 42, 44 are coupled to the pump source 20 so that the pump source 20 provides different durations of excitation current to the three wires 40, 42, 44. In more particular, the phase I pump of FIG. 2 is applied to wire 40, the phase II pump of FIG. 2 is applied to wire 42 and the phase III pump of FIG. 2 is applied to wire 44. Each of the wires 40, 42, 44 is coated with a thin magnetic film as described in connection with FIG. 3*a*. Individual coils 36 are wound about each of the plated wires, 40, 42, 44 as illustrated in FIG. 4*a*. One end of the coils is coupled to a point of reference potential, such as ground. Each of the coils 36 have inherent self-capacitance and self-resistance whereby they each resonate at a frequency near *f*, which is equal to one half the pump frequency 2*f*. A signal of frequency *f* is applied from a source not shown by way of a coupling winding $38_i$ to a coil 36 of the plated wire 40. A separate coil 38 couples the aforesaid coil 36 on the plated wire 40 to another coil 36 on the plated wire 42. A different coil or linking means 38 couples the aforesaid coil 36 on the plated wire 42 to a different coil 36 on the plated wire 44 in similar fashion. Another coupling means 38 couples the last named coil 36 on the plated wire 44 to a different coil 36 on the plated wire 40. Finally, a separate coupling means $38_o$ coupled to the last coil 36 of wire 40, provides an output signal therefrom to a suitable load or other utilization circuit not shown.

In operation then, a signal applied to the first input winding $38_i$ will produce an oscillation in the first coil 36 on wire 40 during the phase I pump cycle. This oscillation is coupled through coil 38 to the first coil 36 on wire 42. During the phase II pump cycle an oscillation will build up in the first coil 36 of wire 42. The oscillation thus developed in the first coil 36 on wire 42 is then coupled through winding 38 to the first coil 36 on wire 44 where an oscillation will build up during the phase III pump cycle. This oscillation in turn is transferred back through winding 38 to the second coil 36 on wire 40 during the phase I pump cycle and the cycle of transferring oscillations from wire 40 to 42 to 44 and back to wire 40 repeats itself until the last coil 36 produces an output from winding $38_o$.

Referring to FIG. 4*b*, there is shown a shift register including plated wires 40, 42, 44, which receive excitation current from pump source 20. On the plated wire 40 are individual coils 46, 52 and 58. Similarly, coils 48 and 54 are wound on plated wire 42, and the plated wire 44 has wound thereon coils 50, 56. A portion of the winding of coil 46 is wound about the coil 48. A portion of the winding of the coil 48 is wound about the coil 50. A portion of the coil 50 is wound about the coil 52. A portion of the coil 52 is wound about the coil 54. A portion of the coil 54 is wound about the coil 56. A portion of the coil 56 is wound about the coil 58. A portion of the coil 58 is coupled to an output terminal 59, for providing an output signal to a load or other suitable utilization circuit. An input signal can be applied by way of a line 45, which is wound about the coil 46. The operation of FIG. 4*b* is the same as that described for FIG. 4*a*. The difference between FIGS. 4*a* and 4*b* is that the register shown in FIG. 4*a* utilizes the interstage coupling shown in FIG. 3*a* whereas the register of FIG. 4*b* utilizes the interstage coupling shown in FIG. 3*c*.

It is noted that with both shift registers illustrated in FIGS. 4*a* and 4*b*, that no fixed capacitances, resistances, or semi-conductors have been utilized.

Each of the resonator circuits 32, which are illustrated by way of example within dotted lines in FIGS. 3*a* and 3*b*, can oscillate in one of two stable phases during the duration of excitation current from the pump source 20. Which of the two stable states is present depends upon the phase of the input signal which is transferred into the resonator 32 from a preceding stage or signal source. In the shift register, the particular phase of oscillation is shifted from one coil to the other. Hence, the particular phase of oscillation of a resonator 32 can designate either a zero or a one in accordance with binary logic.

FIGS. 5*a*, 5*b*, and 5*c* each illustrate a majority gate circuit. Each of the figures show a plated wire 60 and 62. Each of the wires 60, 62 are coupled to suitable terminals of a pump source such as pump source 20 in a manner which is schematically indicated by the Roman numeral designations I, II and III. Individual windings 36 are wound about the wires 60, 62 forming resonator circuits 32, each of which operate in a manner described hereinabove. Part of the winding of one of the coils 36 as shown in FIG. 5*a* is coupled to the other coils. With three input signals applied to three separate windings on the plated wire 60, which signals represent quantities X, Y and Z of either 0 phase or $\pi$ phase, the resultant signal coupled to the wire 36 on the plated wire 62 is that phase represented by the majority of the coils represented by the stages X, Y, and Z.

In a similar manner, FIG. 5*b* shows a majority gate circuit having separate coupling means 64, 66, 68, which couple the individual resonating coils 36 on the plated wire 60 to the resonator coil 36 on the plated wire 62.

In a similar manner, FIG. 5*c* illustrates a majority gate circuit wherein a separate coupling meanss 70 couples the three coils 36 wound about the plated wire 60 to the output coil 36, wound about the plated wire 62. This embodiment is the best mode contemplated by the inventors.

By practicing the teachings of this invention, logic circuitry can be provided which is highly useful in electrical data processing circuits. Semi-conductors, transistors, individual resistors, and capacitors are eliminated. Only two elements are used, namely copper-beryllium wire plated with a thin film of magnetic alloy, and nichrome or copper wire. Logic circuitry can be created which is simple to construct, rugged in construction, nuclear resistant, and has a wide temperature range that can operate at low power at relatively high frequencies.

Various modifications, without departing from the spirit and scope of the claims, will become apparent to those skilled in the art.

The embodiments of the invention in which an exclusive property or privilege is claimed are defined as follows:

1. A parametric circuit comprising:
   a first wire having a thin film of magnetic alloy and adapted to receive a pump current having an alternating current component at a frequency 2*f*; a resistance wire, wound about said first wire, thereby forming an inductor, which together with its self-capacitance and self-resistance forms a tuned circuit resonant at a frequency *f*; and linking means for coupling an input signal at one of two different phases to said tuned circuit.

2. A first wire having an alloy of beryllium and copper with a diameter of two to ten mils, and plated with from 500 to 50,000 angstroms of a nickel-iron alloy, the nickel content lying in a range of 70 to 90%, and having a circumferential anisotropy axis; Nichrome wire having a diameter between 1 to 2 mils wound about said first wire so as to form an inductance, which together with its self-capacitance and self-resistance is tuned to a frequency *f*; and means for applying a pump current having an alternating current component at a frequency 2*f* to said first wire.

3. In combination, a first wire of 5 mil beryllium copper plated with 10,000 angstroms of 80–20 nickel-iron and having an anisotropy axis which is circumferential; 1.4 mil diameter Nichrome wire wound about said first wire forming an inductance, which together with its self-capacitance and self-resistance forms a tuned circuit resonant at a frequency of 20 mc. having a peak to peak oscillation voltage of 2 volts; and a pump source having an alternating frequency component of 40 mc. adapted to be coupled to said first wire.

4. In combination, a pump source having an alternating frequency component at a frequency 2*f*, and having three output terminals therefrom; each of the three output terminals providing a clocked oscillation frequency provided by said pump source, and wherein alternating pump current is applied sequentially to the three terminals, whereby the various terminals are sequentially activated in a specified timed relationship; three wires, each of the three wires being plated with a thin film of magnetic alloy; each of the wires being coupled respectively to one of said terminals; a plurality of individual coils wound about said first wires, each of said coils being adapted to oscillate at a frequency *f*, in the absence of additional capacitance and means for inductively coupling certain of said coils to others of said coils whereby various logic circuits are provided.

5. The combination as claimed in claim 4, wherein said last named means includes individual coils, each of which couple a coil on one of said wires to a coil on another one of said wires.

6. A shift register comprising a pump source adapted to provide a clocked three terminal output wherein a clocked alternating current having a component at a frequency 2*f* is sequentially applied to said three terminals; three wires each plated with a thin film of a magnetic alloy, each of said wires being respectively connected to a separate one of said terminals; a plurality of individual coils on one of said wires, a coil on a second of said wires, and a coil on a third of said wires, each of said coils together with its self-capacitance and self-resistance forming an individual tuned circuit resonant at a frequency *f*; linking means coupling one of said coils on said first wire to said coil on said second wire; linking means coupling said coil on said second wire to said coil on said third wire; and linking means coupling said coil on said third wire to a different one of said coils on said first wire; whereby a signal represented by its phase of oscillation stored in the first coil on said first wire is shifted to the coil on said second wire, then to the coil on said third wire, and then to said different coil on said first wire.

7. In combination, a shift register comprising three groups of wires, each of said wires having a thin magnetic film deposited thereon; an alternating power supply circuit having a frequency 2*f* and a source of DC bias; means for applying said 2*f* frequency from said power supply circuit to each of said groups of wires in an overlapping sequential manner; individual coils wound about each of said wires; each of said coils wound in such manner so that its inductance together with its self-capacitance and self-resistance forms a resonant circuit having a resonant frequency of near *f*; a separate coupling means coupling a coil on a wire of said first group to a coil on a wire of said second group; a separate coupling means coupling said last named coil to a coil of a wire of said third group.

8. The invention as claimed in claim 7, wherein the number of wires in each of said groups is one.

9. A shift register comprising a first wire, a second wire, and a third wire, each of said wires having a thin magnetic film coated thereon; means for providing a clocked alternating current source with a steady DC bias to each of said three wires; a plurality of windings wound on each of said wires, each of said windings forming a resonant circuit with its self-capacitance, in the absence of any fixed capacitance, to resonate at a frequency near *f*;

a portion of a winding on one of said wires being wound about a winding on a second of said wires; and a portion of said last named winding on said second of said wires being wound about a winding on a third of said wires.

References Cited

FOREIGN PATENTS 921,850 3/1963 Great Britain.

OTHER REFERENCES

Wang, C. P.: "The Transient Build-Up and Phase Synchronization of Thin Magnetic Film Parametrons." IEEE Transactions on Communication & Electronics. Presented at IEEE Conference on Apr. 19, 1963.

Tereda, H.: "The Parametron—An Amplifying Logic Element," Control Engineering—April 1959 pp.110–115.

Smith, D. O.: In "Molecular Science and Molecular Engineering," (A Von Hippel, ed.) pp. 349–356. Wiley, New York, 1959.

STANLEY M. URYNOWICZ, Jr., *Primary Examiner.*